(12) United States Patent
Adil et al.

(10) Patent No.: US 10,393,919 B2
(45) Date of Patent: Aug. 27, 2019

(54) METHODS AND APPARATUS FOR DETERMINING DOWNHOLE PARAMETES

(75) Inventors: Abdur Rahman Adil, Sindh (PK); Elena Borisova, Paris (FR); Tullio Moscato, Paris (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 261 days.

(21) Appl. No.: 14/125,288

(22) PCT Filed: Jun. 13, 2012

(86) PCT No.: PCT/US2012/042147
§ 371 (c)(1),
(2), (4) Date: Jan. 22, 2014

(87) PCT Pub. No.: WO2012/174046
PCT Pub. Date: Dec. 20, 2012

(65) Prior Publication Data
US 2014/0157884 A1    Jun. 12, 2014

Related U.S. Application Data

(60) Provisional application No. 61/496,180, filed on Jun. 13, 2011.

(51) Int. Cl.
*G01V 9/00*   (2006.01)
*E21B 47/00*   (2012.01)
(Continued)

(52) U.S. Cl.
CPC .............. *G01V 9/005* (2013.01); *E21B 47/00* (2013.01); *E21B 47/065* (2013.01); *E21B 47/10* (2013.01);
(Continued)

(58) Field of Classification Search
CPC ... G01V 9/005; E21B 47/065; E21B 47/1005; E21B 49/087
See application file for complete search history.

(56) References Cited

U.S. PATENT DOCUMENTS

| | | |
|---|---|---|
| 4,547,080 A | 10/1985 | Dunn et al. |
| 4,852,790 A | 8/1989 | Karlinski |

(Continued)

FOREIGN PATENT DOCUMENTS

| | | |
|---|---|---|
| EP | 1435430 A1 | 7/2004 |
| GB | 2395969 | 6/2004 |

(Continued)

OTHER PUBLICATIONS

International search report for the equivalent PCT patent application No. PCT/US2012/042147 dated Aug. 31, 2012.
(Continued)

*Primary Examiner* — Paul M. West

(57) ABSTRACT

Apparatus and methods for determining downhole fluid parameters are disclosed herein. An example method includes disposing a downhole tool in a well. The downhole tool has a sensor including a heater and a temperature sensor. The example method further includes flowing a fluid in the well. The example method also includes determining a first velocity of the fluid at a first depth via the sensor and, based on the first velocity of the fluid, a first parameter of the well at the first depth is determined.

20 Claims, 10 Drawing Sheets

(51) Int. Cl.
*E21B 47/06* (2012.01)
*E21B 47/10* (2012.01)
*E21B 49/08* (2006.01)

(52) U.S. Cl.
CPC .......... *E21B 47/1005* (2013.01); *E21B 49/08* (2013.01); *E21B 49/087* (2013.01)

(56) References Cited

U.S. PATENT DOCUMENTS

| | | |
|---|---|---|
| 4,979,112 A | 12/1990 | Ketcham |
| 5,415,037 A | 5/1995 | Griston |
| 5,428,994 A | 7/1995 | Wenzel et al. |
| 5,551,287 A | 9/1996 | Maute et al. |
| 5,610,331 A * | 3/1997 | Georgi .................. E21B 47/065 166/250.01 |
| 5,890,538 A | 4/1999 | Beirute et al. |
| 5,965,813 A | 10/1999 | Wan et al. |
| 6,176,323 B1 | 1/2001 | Weirich |
| 6,227,045 B1 | 5/2001 | Morse et al. |
| 6,751,556 B2 | 6/2004 | Schroeder et al. |
| 6,856,909 B2 | 2/2005 | Banning-Geertsma |
| 6,889,544 B2 | 5/2005 | Tanimoto et al. |
| 7,000,692 B2 | 2/2006 | Hosie et al. |
| 7,003,405 B1 | 2/2006 | Ho |
| 7,536,905 B2 | 5/2009 | Jalali et al. |
| 7,731,421 B2 | 6/2010 | Hadley |
| 2002/0100316 A1* | 8/2002 | James .................. G01F 1/6845 73/204.26 |
| 2003/0051919 A1 | 3/2003 | Moore et al. |
| 2004/0038028 A1 | 2/2004 | Tanaka et al. |
| 2004/0043501 A1 | 3/2004 | Means et al. |
| 2004/0104045 A1 | 6/2004 | Larovere |
| 2004/0112596 A1 | 6/2004 | Williams et al. |
| 2004/0252748 A1 | 12/2004 | Gleitman |
| 2005/0263281 A1 | 12/2005 | Lovell et al. |
| 2006/0010973 A1 | 1/2006 | Brown |
| 2006/0113077 A1 | 6/2006 | Willberg et al. |
| 2006/0257676 A1 | 11/2006 | Itada et al. |
| 2007/0158064 A1 | 7/2007 | Pribnow et al. |
| 2007/0289744 A1 | 12/2007 | Bingamon et al. |
| 2007/0295081 A1 | 12/2007 | Orban |
| 2008/0023196 A1 | 1/2008 | Crawley et al. |
| 2008/0137711 A1 | 6/2008 | Gleitman |
| 2008/0236836 A1 | 10/2008 | Weng |
| 2008/0296017 A1* | 12/2008 | Sonne .................. E21B 43/24 166/264 |
| 2008/0308272 A1 | 12/2008 | Thomeer et al. |
| 2009/0091320 A1 | 4/2009 | Flaum et al. |
| 2009/0145601 A1 | 6/2009 | Bailey |
| 2009/0151937 A1 | 6/2009 | Goodwin et al. |
| 2010/0051264 A1 | 3/2010 | Willauer |
| 2010/0073189 A1 | 3/2010 | Mandal et al. |
| 2010/0228502 A1 | 9/2010 | Atherton |
| 2010/0230105 A1 | 9/2010 | Vaynshteyn |
| 2010/0294021 A1 | 11/2010 | Makino et al. |
| 2010/0326659 A1 | 12/2010 | Schultz et al. |
| 2011/0017468 A1 | 1/2011 | Birch et al. |
| 2011/0028062 A1 | 2/2011 | Chester et al. |
| 2011/0192598 A1* | 8/2011 | Roddy .................. E21B 33/13 166/253.1 |
| 2011/0315375 A1 | 12/2011 | Moscato et al. |

FOREIGN PATENT DOCUMENTS

| | | |
|---|---|---|
| WO | 99/34198 | 7/1999 |
| WO | 2005/064117 | 7/2005 |

OTHER PUBLICATIONS

International search report for the equivalent PCT patent application No. PCT/US2012/042129 dated Aug. 31, 2012.
International search report for the equivalent PCT patent application No. PCT/US2012/042135 dated Aug. 31, 2012.
International Search Report issued in PCT Patent Appl. No. PCT/US2012/042149 dated Sep. 18, 2013; 3 pages.
International Search Report issued in PCT Patent Appl. No. PCT/US2012/042153 dated Sep. 18, 2013; 2 pages.
International Search Report issued in PCT Patent Appl. No. PCT/US2012/042155 dated Nov. 7, 2013; 4 pages.
International Search Report issued in PCT Patent Appl. No. PCT/US2012/042132 dated Oct. 31, 2013; 3 pages.
Office Action issued in European Patent Application No. 12800169.0 dated Feb. 15, 2016; 4 pages.
Definition of "drill string" accessed on Nov. 16, 2016 via Schlumberger Oilfield Glossary, http://www.glossary.oilfiled.slb.com/Terms/d/dril_string.aspx; 1 page.
Definition of mud pump accessed on Nov. 22, 2016 via United States Department of Labor, Occupational Safety and Health Administration, https://www.osha.gov/SLTC/etools/oilandgas/index.html; 4 pages.
Definition of logging accessed on Nov. 22, 2016 via Schlumberger Oil Filed Glossary, http://www.glossary.oilfiled.slb.com/Terms/l/logging.aspx; 1 page.
Office Action issued in U.S. Appl. No. 14/125,296 dated Nov. 29, 2016; 15 pages.
Office Action issued in U.S. Appl. No. 14/125,293 dated Dec. 22, 2016; 21 pages.
Office Action issued in U.S. Appl. No. 14/125,295 dated Jun. 21, 2017; 8 pages.
Office Action issued in U.S. Appl. No. 14/125,300 dated Jun. 16, 2017; 11 pages.
Office Action issued in U.S. Appl. No. 14/125,303 dated Apr. 20, 2017; 15 pages.
Office Action issued in Mexico Patent Application No. MX/a/2013/014652 dated Jun. 11, 2018, 8 pages.

* cited by examiner

METHODS AND APPARATUS FOR DETERMINING DOWNHOLE PARAMETES

RELATED APPLICATIONS

This patent claims the benefit of U.S. Provisional Patent Application Ser. No. 61/496,180, entitled "System and Method for Determining Downhole Fluid and Borehole Parameters," which was filed on Jun. 13, 2011, and is incorporated herein by reference in its entirety.

BACKGROUND

A well may be drilled through a subterranean formation to extract hydrocarbons. A dimension (e.g., a cross-sectional area) of the well may vary with a depth of the well. Further, conditions in the well may be harsh. For example, temperatures inside the well may be from about negative 25° C. to about positive 150° C. and pressures may be up to or exceed about 12,500 psi.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An example method disclosed herein includes disposing a downhole tool in a well. The downhole tool includes a sensor having a heater and a temperature sensor. The example method further includes flowing a fluid in the well. The example method also includes determining a first velocity of the fluid at a first depth via the sensor and, based on the first velocity of the fluid, determining a first parameter of the well at the first depth.

Another example method disclosed herein includes determining a first depth of a sensor of a downhole tool disposed in a well. The sensor includes a heater and a temperature sensor. The example method further includes determining a first velocity of a fluid in the well via the sensor and determining a first parameter of the well based on the first velocity of the fluid. The example method also includes associating the first parameter with the first depth and generating a profile of the well based on the first parameter.

Another example method disclosed herein includes disposing a heater and a temperature sensor at a first depth. The example method further includes heating the fluid via the heater and determining a temperature of the fluid via the temperature sensor. Based on a thermal property between the heater and the fluid, a first velocity of the fluid at the first depth is determined. The example method also includes determining a first parameter of the well at the first depth based on the first velocity of the fluid.

BRIEF DESCRIPTION OF THE DRAWINGS

Embodiments of methods and apparatus for determining downhole parameters are described with reference to the following figures. The same numbers are used throughout the figures to reference like features and components.

DETAILED DESCRIPTION

Figure 1A:
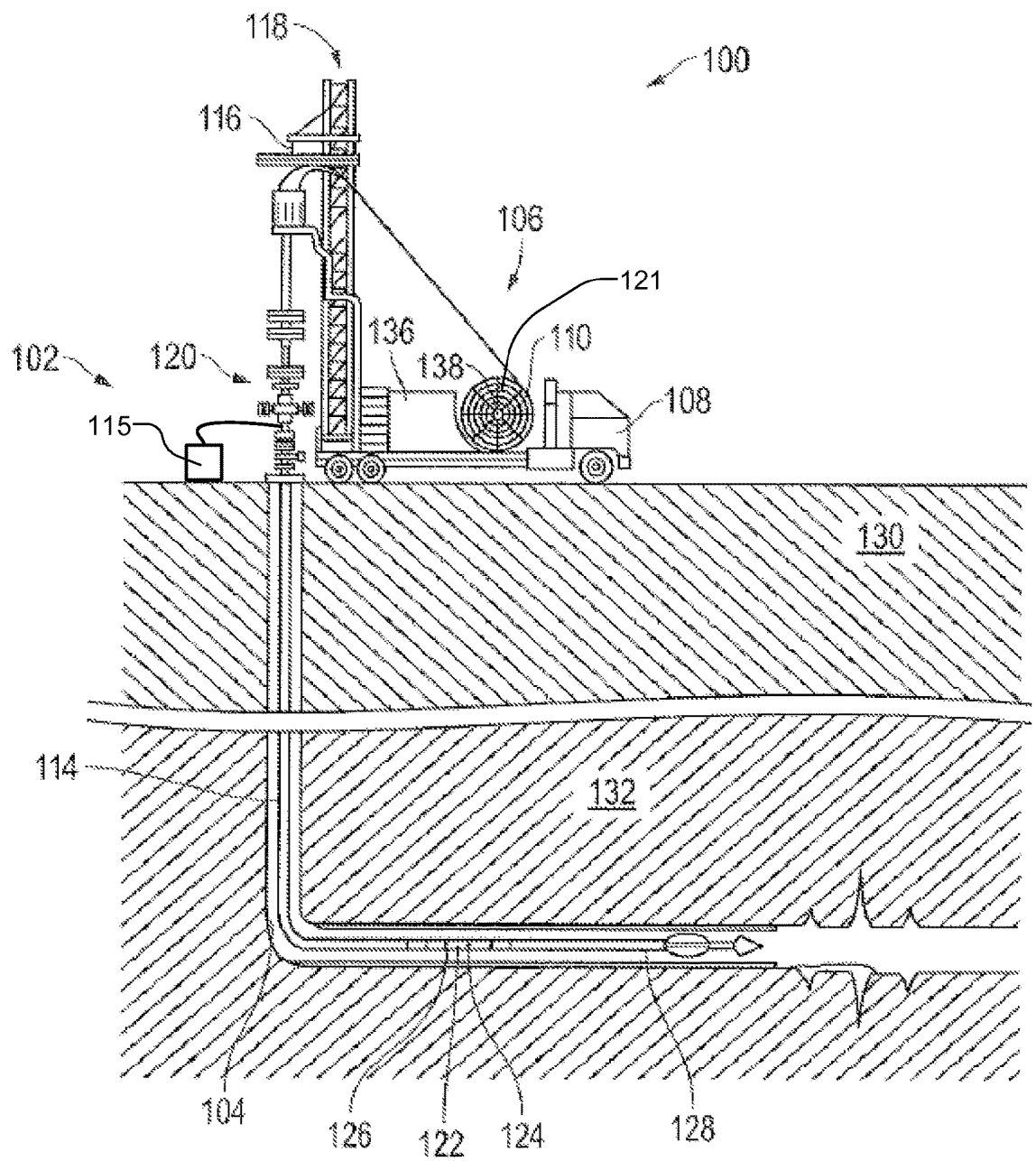
FIG. 1A illustrates an example system in which embodiments of methods and apparatus for determining downhole parameters can be implemented.

It is to be understood that the following disclosure provides many different embodiments or examples for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features such that the first and second features may not be in direct contact.

Although some example fluid sensing systems disclosed herein are discussed as being positioned on treatment tools of a coiled tubing system, other examples are employed with and/or without treatment tools. For example, a fluid sensing element may be employed apart from the coiled tubing system. Thus, in some examples, the fluid sensing system may be deployed by a drill pipe, a drill string or any other suitable conveyance device.

Example apparatus and methods disclosed herein may be used to determine downhole parameters. An example method disclosed herein may include disposing a downhole tool in a well. In some examples, the downhole tool includes a sensing element including a heater and a temperature sensor. The example method may include flowing a fluid in a well and determining a depth of the sensing element. In some examples, the heater heats the fluid and a temperature of the fluid is determined via the temperature sensor. Based on a thermal property between the heater and the fluid, a velocity of the fluid at the depth may be determined. A parameter (e.g., a width, a diameter, a cross-sectional area, etc.) of the well at the depth may be determined based on the velocity. In some examples, parameter is associated with the depth and logged (e.g., stored in a database). Based on the parameter of the well, a profile (e.g., a chart, a graph, a map, a model, a table, etc.) of the well may be generated.

FIG. 1A is a schematic depiction of a wellsite 100 with a coiled tubing system 102 deployed into a well 104. The coiled tubing system 102 includes surface delivery equipment 106, including a coiled tubing truck 108 with reel 110, positioned adjacent the well 104 at the wellsite 100. The coiled tubing system 102 also includes coiled tubing 114. In some examples, a pump 115 is used to pump a fluid into the well 104 via the coiled tubing. With the coiled tubing 114 run through a conventional gooseneck injector 116 supported by a mast 118 over the well 104, the coiled tubing 114 may be advanced into the well 104. That is, the coiled tubing 114 may be forced down through valving and pressure control equipment 120 and into the well 104. In the coiled tubing system 102 as shown, a treatment device 122 is provided for delivering fluids downhole during a treatment application. The treatment device 122 is deployable into the well 104 to carry fluids, such as an acidizing agent or other treatment fluid, and disperse the fluids through at least one injection port 124 of the treatment device 122.

The example treatment device 122 is optional and its use will depend on the various applications. The coiled tubing system 102 of FIG. 1A is depicted as having a fluid sensing system 126 positioned about the injection port 124 for determining parameters of fluids in the well 104. The fluid sensing system 126 is configured to determine fluid parameters, such as fluid direction and/or velocity. In other examples, other downhole parameters are determined.

In some examples, the coiled tubing system 102 includes a logging tool 128 for collecting downhole data. The logging tool 128 as shown is provided near a downhole end of the coiled tubing 114. The logging tool 128 acquires a variety of logging data from the well 104 and surrounding formation layers 130, 132 such as those depicted in FIG. 1A. The logging tool 128 is provided with a host of well profile generating equipment or implements configured for production logging to acquire well fluids and formation measurements from which an overall production profile may be developed. Other logging, data acquisition, monitoring, imaging and/or other devices and/or capabilities may be provided to acquire data relative to a variety of well characteristics. Information gathered may be acquired at the surface in a high speed manner, and, where appropriate, put to immediate real-time use (e.g. via a treatment application). Some examples do not employ the logging tool 128.

With reference still to FIG. 1A, the coiled tubing 114 with the treatment device 122, the fluid sensing system 126 and the logging tool 128 thereon is deployed downhole. As these components are deployed, treatment, sensing and/or logging applications may be directed by way of a control unit 136 at the surface. For example, the treatment device 122 may be activated to release fluid from the injection port 124; the fluid sensing system 126 may be activated to collect fluid measurements; and/or the logging tool 128 may be activated to log downhole data, as desired. The treatment device 122, the fluid sensing system 126 and the logging tool 128 are in communication with the control unit 136 via a communication link (FIGS. 1B-1D), which conveys signals (e.g., power, communication, control, etc.) therebetween. In some examples, the communication link is located in the logging tool 128 and/or any other suitable location. As described in greater detail below, the communication link may be a hardwire link or an optical link.

In the illustrated example, the control unit 136 is computerized equipment secured to the truck 108. However, the control unit 136 may be portable computerized equipment such as, for example, a smartphone, a laptop computer, etc. Additionally, powered controlling of the application may be hydraulic, pneumatic and/or electrical. In some examples, the control unit 136 controls the operation, even in circumstances where subsequent different application assemblies are deployed downhole. That is, subsequent mobilization of control equipment may not be included.

The control unit 136 may be configured to wirelessly communicate with a transceiver hub 138 of the coiled tubing reel 110. The receiver hub 138 is configured for communication onsite (surface and/or downhole) and/or offsite as desired. In some examples, the control unit 136 communicates with the sensing system 126 and/or logging tool 128 for conveying data therebetween. The control unit 136 may be provided with and/or coupled to databases, processors, and/or communicators for collecting, storing, analyzing, and/or processing data collected from the sensing system and/or logging tool.

In one example, the communication link between the treatment device 122, fluid sensing system 126 and/or logging tool 128 and the surface or control unit 136 may be implemented using a fiber optic or wired telemetry system. As such, the communication link/system may include tubing that provides and/or possesses a certain amount of stiffness in compression, similar to coiled tubing. In some such examples, a fiber optic tube is disposed inside coiled tubing. In some examples, a cross-sectional area of the fiber optic tube may be small relative to an inner area defined by the coiled tubing to limit a physical influence of the fiber optic tube on mechanical behavior of the coiled tubing during deployment and retrieval, thereby preventing "bird-nesting" or bundling within the coiled tubing. In some examples, optical fiber equipped coiled tubing is deployed into and retrieved from a wellbore at a greater speed than coiled tubing with wireline.

Figure 1B:
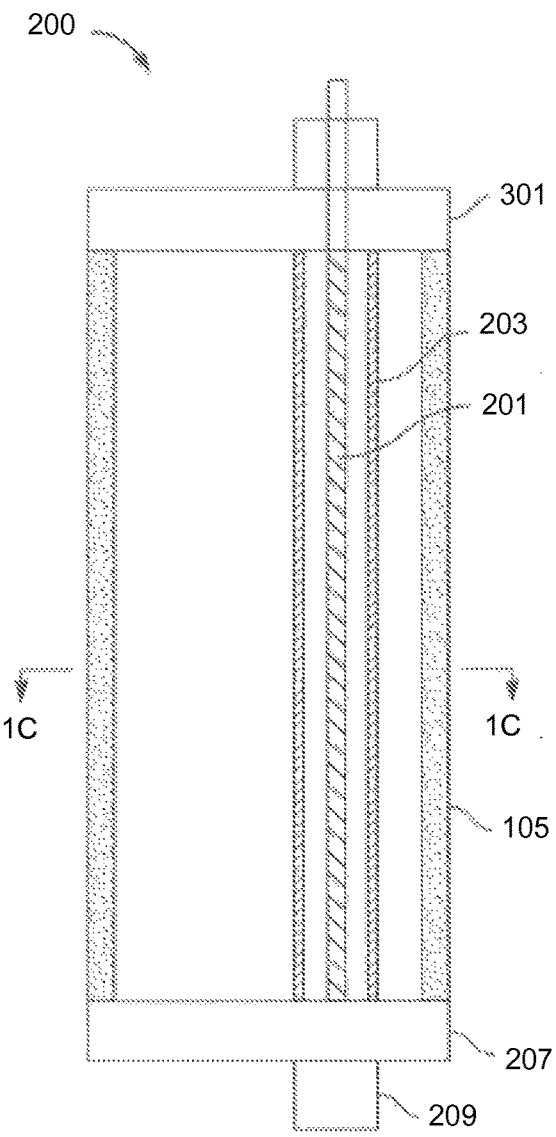
FIG. 1B illustrates various components of an example device that can implement embodiments of the methods and apparatus for determining downhole parameters.

FIG. 1B illustrates an example communication link 200 between the treatment device 122, the fluid sensing system 126, the logging tool 128, and/or the surface or control unit 136. In the illustrated example, the communication link 200 includes a tubular 105 within which a duct or tube 203 is disposed. In the illustrated example, an optical fiber 201 is disposed in the tube 203. In some examples, more than one optical fiber is disposed in the tube 203. In the illustrated example, a surface termination 301 and a downhole termination 207 are provided to couple the optical fiber 201 to one or more devices or sensors 209. In some examples, the optical fiber 201 is a multi-mode optical fiber. In other examples, the optical fiber 201 is a single-mode optical fiber. The devices or sensors 209 are, for example, gauges, valves, sampling devices, temperature sensors, pressure sensors, distributed temperature sensors, distributed pressure sensors, flow-control devices, flow rate measurement devices, oil/water/gas ratio measurement devices, scale detectors, actuators, locks, release mechanisms, equipment sensors (e.g., vibration sensors), sand detection sensors, water detection sensors, data recorders, viscosity sensors, density sensors, bubble point sensors, composition sensors, resistivity array devices and sensors, acoustic devices and sensors, other telemetry devices, near infrared sensors, gamma ray detectors, $H_2S$ detectors, $CO_2$ detectors, downhole memory units, downhole controllers, perforating devices, shape charges, firing heads, locators, and other devices.

Figure 1C:
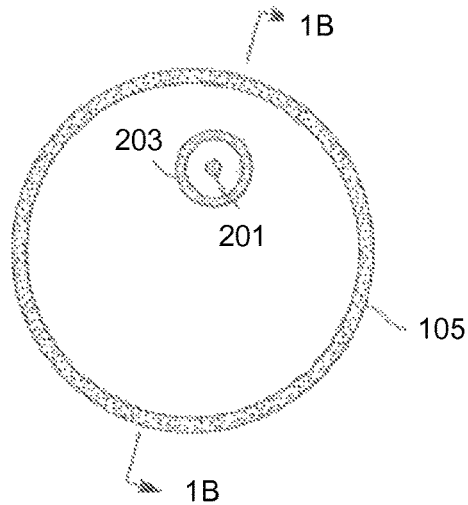
FIG. 1C illustrates various components of the example device of FIG. 1B that can implement embodiments of the example methods and apparatus for determining downhole parameters.

FIG. 1C is a cross-sectional view of the communication link 200 of FIG. 1B. Inside the tube 203, an inert gas such as nitrogen may be used to fill the space between the optical fiber or fibers 201 and the interior of the tube 203. In some examples, the fluid is pressurized to prevent the tube 203 from buckling. In some examples, a laser-welding technique is performed in an enclosed environment filled with an inert gas such as, for example, nitrogen to avoid exposing the optical fiber 201 to water or hydrogen during manufacturing. In some examples, the tube 203 is constructed by bending a metal strip around the optical fiber 201 and then welding that strip to form the tube 203. An example laser-welding technique is described in U.S. Pat. No. 4,852,790, which is hereby incorporated herein by reference in its entirety. In some examples, gel including palladium or tantalum is inserted into an end of the tube 203 to separate hydrogen ions from the optical fiber 201 during transportation of the communication link 200.

Materials suitable for use in the tube 203 provide stiffness to the tube 203, are resistant to fluids encountered in oilfield applications, and/or are rated to withstand the high temperature and high pressure conditions found in some wellbore environments. In some examples, the tube 203 is a metallic material and the tube 203 may include metal materials such as, for example, Inconel™, stainless steel, or Hasetloy™.

In some examples, the tube 203 has an outer diameter of about 0.071 inches to about 0.125 inches. In some examples, the tube 203 is less than or equal to about 0.020 inches (0.508 mm) thick. The above-noted dimensions are merely examples and, thus, other dimensions may be used without departing from the scope of this disclosure.

Figure 1D:
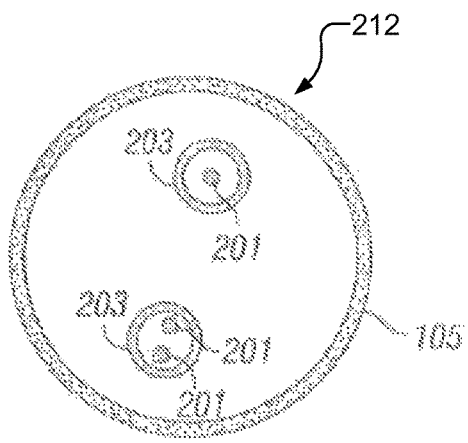
FIG. 1D illustrates various components of another example device that can implement embodiments of the methods and apparatus for determining downhole parameters.

FIG. 1D illustrates another example communication link 212. In the illustrated example, the communication link 212 includes a tubular 105 and a first tube 203 and a second tube 203. A first optical fiber 201 is disposed in the first tube. A second optical fiber 201 and a third optical fiber 201 are disposed in the second tube 203. In some example, the first optical fiber 201 is coupled to one of the devices 209, and the second optical fiber 201 and the third optical fiber 201 are coupled to one or more other ones of the devices 209. In some examples, more than one of the devices 209 may be coupled to a single optical fiber 201.

Figure 2B:
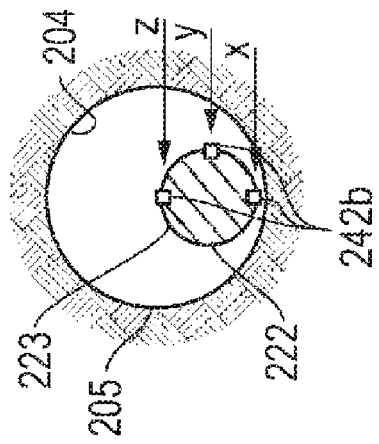
FIG. 2B illustrates various components of the example device of FIG. 2A that can implement embodiments of the methods and apparatus for determining downhole parameters.
Figure 2C:
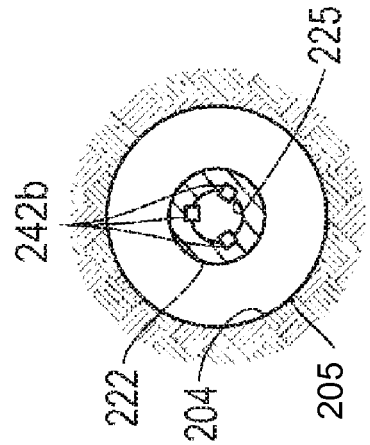
FIG. 2C illustrates various components of the example device of FIG. 2A that can implement embodiments of the methods and apparatus for determining downhole parameters.
Figure 2A:
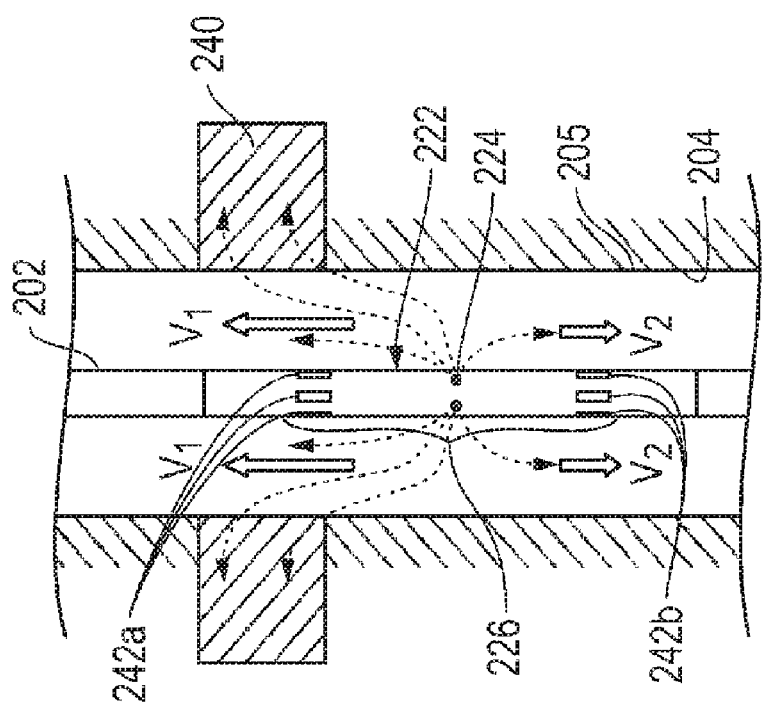
FIG. 2A illustrates various components of an example device that can implement embodiments of the methods and apparatus for determining downhole parameters.

FIGS. 2A-2C are schematic views of a portion of a coiled tubing system 202 with a treatment device 222 and fluid sensing system 226 on a coiled tubing 214 thereof, which may be used to implement the coiled tubing system 102, the treatment device 122 and/or the fluid sensing system 126 of FIG. 1A. FIG. 2A is a longitudinal view, partially in cross-section, depicting the fluid sensing system 226 positioned about the treatment device 222. As shown, the treatment device 222 has injection ports 224 for dispersing injection fluids into a well 204 as schematically depicted by the dashed arrows.

The injection fluid may be dispersed to treat a portion of a well 204, such as pay zone 240, to enhance production of fluid therefrom. As illustrated in FIG. 2A, stimulation fluid, such as acid, may be injected into the well 204 nearby the pay (or oil producing) zone 240 by means of the treatment tool 222. The acid is intended for the pay zone 240, but is shown positioned downhole therefrom. Precisely positioning the injection ports 224 against a zone of interest may be a challenging task due to uncertainties that may exist in target depth and/or tool position. The sensing system 226 around the injection port 224 may be tailored to measure a flow split upstream and downstream of the injection ports 224 in the well 204. Fluid movement may be used to indicate where the pay zone 240 is located relative to the injection port 224. Once known, the position of the treatment device 222 and the injection ports 224 may be positioned to affect treatment as desired.

As the fluid is released from the treatment device 222, the flow of the fluid is split with an upstream portion of the fluid moving upstream and a downstream portion of the injection fluid moving downstream. The upstream portion of the injection fluid travels upstream at a given velocity as indicated by the arrows labeled V1. The downstream portion of the injection fluid travels downstream at a given velocity as indicated by the arrows labeled V2. While the fluid is depicted as flowing in a specific direction, it will be appreciated that the flow of the fluid may vary with operating conditions.

While the example sensing system 226 illustrated in FIGS. 1 and 2A-2C is described in conjunction with the coiled tubing system 102 for determining fluid parameters, the sensing system 226 may also be used in other fluid flow applications such as, for example, detection of fluid cross-flow between zones, production logging (e.g., for single phase velocity, or in conjunction with Flow Scanner Imaging (FSI) complementary to a spinner in a low velocity range), downhole or surface testing in conjunction with use of a flowmeter (e.g., low speed Venturi based flowmeter applications), leakage detection (e.g., with dynamic seals), with other tools where flow velocity measurements is desired, among others. The sensing system 226 may be positioned on any surface, downhole and/or other movable equipment, such as a downhole tool, and/or in fixed equipment, such as a casing (not shown).

The sensing system 226 is depicted in FIG. 2A as having a plurality of sensor elements 242a,b positioned about the treatment device 222. In some examples, one or more sensor elements 242 a,b are positioned about the coiled tubing system 102 to perform fluid and/or other downhole measurements. In some such examples, the sensor elements 242*a,b* are positioned about the injection port(s) 224 to measure fluid parameters. The fluid measured is the injection fluid dispersed from the treatment device 222, but may also include other fluids in the well (e.g., water, hydrocarbons, gases, etc.) that mix with the injection fluid as it is dispersed.

An upstream portion of the sensor elements 242*a* are depicted as being positioned on the treatment device 222 a distance upstream therefrom. A downstream portion of the sensor elements 242*b* are depicted as being positioned on the treatment device 222 a distance downstream therefrom. The upstream sensor elements 242*a* and/or the downstream sensor elements 242*b* may be arranged radially about the treatment apparatus 222. In the illustrated example of FIG. 2B, the sensor elements 242*a,b* are positioned at various radial locations x,y,z about the treatment apparatus 222. While a specific configuration for the sensor elements 242*a,b* is depicted in FIGS. 2A and 2B, it will be appreciated that one or more sensor elements may be positioned at various locations (longitudinally and/or radially) about the coiled tubing system 202 and/or well 204.

At least some of the sensor elements 242*a,b* are capable of sensing fluid parameters, such as fluid direction and velocity. In some examples, more than one of the sensor elements 242*a,b* may be capable of measuring the fluid parameters. In some examples, at least one of the sensor elements 242*a* for measuring fluid parameters is positioned upstream from the injection port 224, and at least one of the sensor elements 242*b* for measuring fluid parameters is positioned downstream from the injection port 224. In this configuration, the measurements of the upstream and the downstream fluid sensors 242*a,b* may be compared to determine fluid parameters, such as fluid direction and/or fluid velocity. The ratio between upper and lower velocities and fluid direction obtained from measurements of the upstream and downstream sensing elements 242*a,b* may be used to generate real-time monitoring of where the fluid is flowing during the treatment, as will be described further herein. Other downhole parameters may also optionally be measured with the fluid sensing system 226 and/or other sensors positioned about the well.

Comparison of multiple sensing elements 242*a,b* may be used to account for differences in measurements taken by the various sensing elements 242*a,b*. In some examples, multiple sensing elements 242*a,b* are used to provide sufficient redundancy and confidence in the measurement results. This redundancy may also reduce the severity of impact where one or more sensor elements 242*a,b* fails, such as in harsh downhole environments involving the use of acids. The multiple sensing elements 242*a,b* may also be used to generate fluid direction and/or velocity information. In such cases, at least one upstream sensor element 242*a* and at least one downstream sensor element 242*b* may be used. In some examples, additional sensor elements 242*a,b* are provided to enhance reliability of the values generated.

In some examples, it may be useful to consider the position of the sensing element 242*a,b* about the treatment tool 222. The number of arrays (or sets of sensing elements 242*a,b*), as well as the number of sensing elements 242*a,b* per array, may vary. As shown in FIG. 2A, the sensing elements 242*a,b* are positioned upstream and downstream to measure fluid as it passes upstream and downstream from the injection ports 224. In some examples, when using corresponding upstream and downstream sensing elements 242*a,b*, the corresponding sensing elements 242*a,b*, are positioned at equal distances from the injection port 224. In some examples, corresponding sensing elements 242*a,b* are identically matched. Matched sensing elements may be spaced at equal distances.

In the illustrated example, multiple sensing elements 242*a,b* are also positioned about the circumference of the tool at 90-degree intervals x, y, and z as shown in FIG. 2B. As shown in FIG. 2B, the sensing elements 242*b* are positioned at radial locations x, y and z about the treatment device 222. The sensing element 242*b* at position x is against a wall 205 of the well 204. The azimuthal arrangement of sensing elements 242*a,b* at positions x, y, and z provides redundancy in case one side of measurements is impeded.

An issue may appear when the tool body (e.g., the treatment tool 222) is eccentric (or not concentric) with the well 204 as shown in FIG. 2B. In the illustrated example, the sensing element $242b_x$ located closer to the wall 205 of the well 204 may read a lower flow value than the sensing elements $242b_y$, $242b_z$ positioned farther from the wall. In such cases, it may be desirable to ignore or remove measurements from potential obstructed sensing elements, such as the sensing element $242b_x$.

As shown in FIG. 2B, the sensing elements 242*b* are positioned on an outer surface 223 of the treatment tool 222. The sensing elements 242*b* may be flush with the outer surface 223, recessed below the outer surface 223 or extended a distance therefrom. In some examples, the sensing elements 242*b* are positioned such that each sensing element 242*b* contacts fluid for measurement thereof, but remains protected. To prevent damage in harsh downhole conditions, protrusion of the sensing elements 242*b* from the treatment tool may be reduced. As shown in FIG. 2C, the sensing elements 242*b* may also be positioned inside the treatment tool 222, for example, on an inner surface 225 thereof.

Figure 2E:
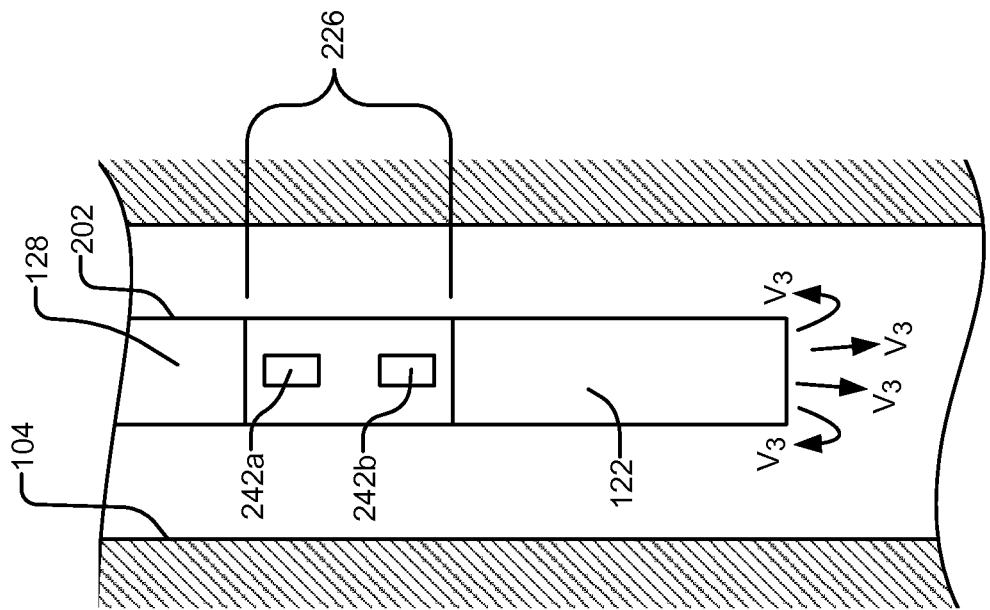
FIG. 2E illustrates various components of yet another example device that can implement embodiments of the methods and apparatus for determining downhole parameters.
Figure 2D:
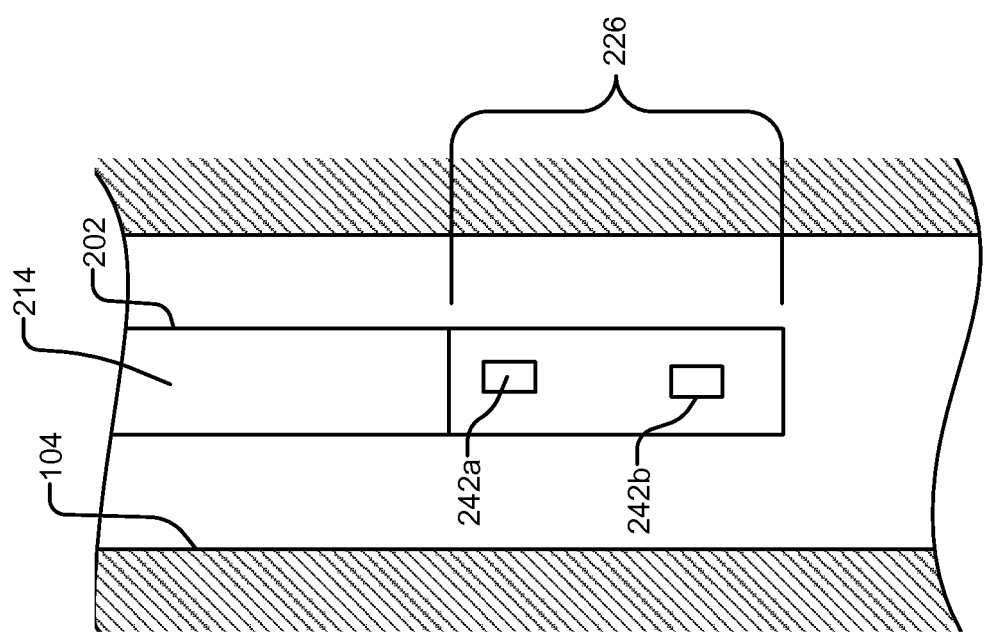
FIG. 2D illustrates various components of another example device that can implement embodiments of the methods and apparatus for determining downhole parameters.

FIGS. 2D and 2E illustrate other portions of the coiled tubing system 202 including the fluid sensing system 226, which may be used to implement the example coiled tubing system 102 of FIG. 1A. In FIG. 2D, the example sensing system 226 is disposed at a lower end of the coiled tubing 114.

In FIG. 2E, the example sensing system 226 is disposed between the logging tool 128 and the treatment tool 122. In the illustrated example, the logging tool 128 is disposed above the sensing system 226 and the treatment tool 122 is disposed below the sensing system 226 in the orientation of FIG. 2E. In some examples, the fluid enters the well 104 as shown by arrows V3. In other examples, the sensing system 226 is disposed at one or more other locations on the coiled tubing 114.

Figure 3:
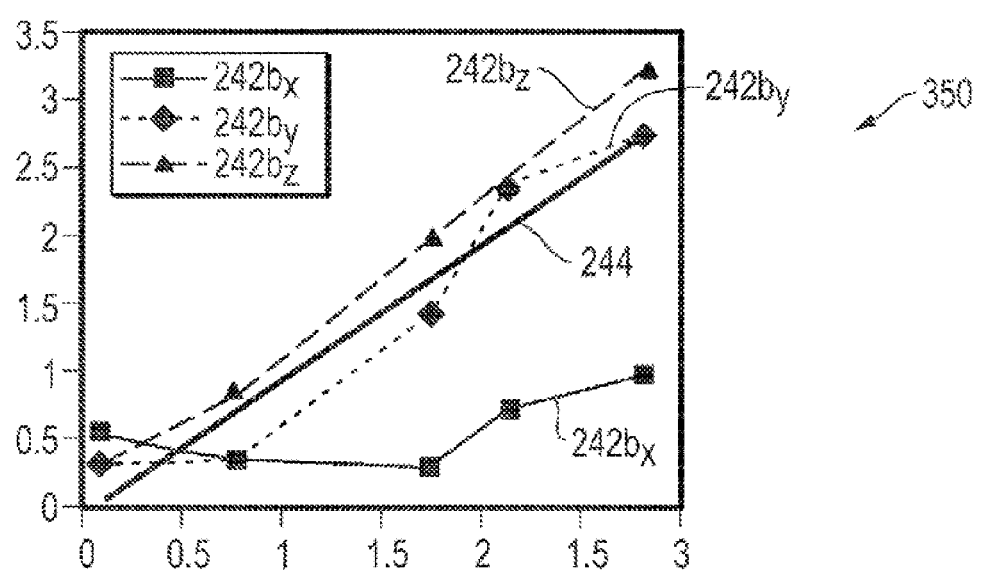
FIG. 3 is a graph depicting sensor measurements taken using the example device of FIG. 2B.

FIG. 3 is a graph 350 depicting sensor data taken from the example sensing elements 242*b* of FIG. 2B. The graph 350 plots flow velocity (x-axis) as a function of sensor output (y-axis) for sensing elements $242b_x$, $242b_y$, and $242b_z$ at positions x, y and z, respectively. As depicted by the graph 350, the flow velocity of the sensing elements $242b_y$ and $242b_z$ at positions y and z are different from the flow velocity of the sensing element $242b_x$ at position x. In other words, readings of the top sensing element $242b_z$ and the 90-degree sensing element $242b_y$ are substantially consistent in determining the flow velocity. However the bottom sensing element $242b_x$ has a flow velocity that is lower.

The graph 350 indicates that the sensing element $242b_x$ at position x is pressed against the wall 205 of the well 204 and is unable to obtain proper readings. Thus, the measurements depicted by line $242b_x$ taken by sensing element 242*b* at position x may be disregarded. The measurements depicted as lines $242b_y$ and $242b_z$ taken by sensing elements 242*b* at positions y and z, respectively, may be combined using conventional analytical techniques (e.g., curve fitting, averaging, etc.) to generate an imposed flow 244. Thus, by placing several sensing elements 242a,b azimuthally around the circumference of a tool and detecting the lowest reading sensing element (e.g., 242$b_x$), the azimuth of a flow obstruction may be determined. The sensing element located opposite to the lowest-reading sensing element (e.g., 242$b_y$), or combinations of other sensing elements, may then be used to perform the flow measurement.

Figure 4A:
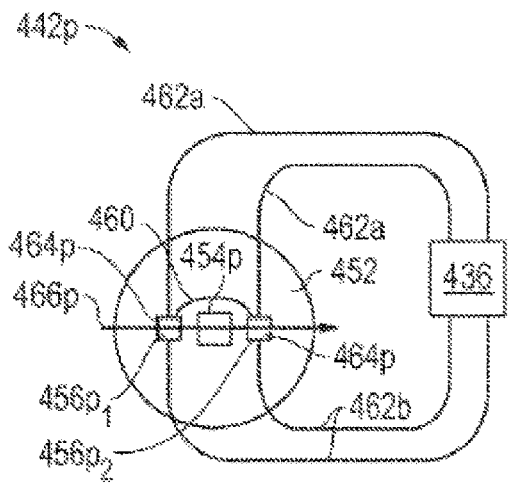
FIG. 4A illustrates various components of an example device that can implement embodiments of the methods and apparatus for determining downhole parameters.
Figure 4B:
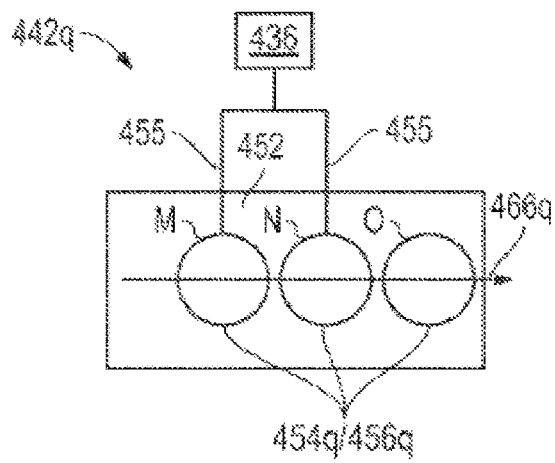
FIG. 4B illustrates various components of an example device that can implement embodiments of the methods and apparatus for determining downhole parameters.

FIGS. 4A and 4B are schematic views of sensing elements 442p and 442q usable as the sensing elements 242a,b of FIGS. 2A and 2B. Each of the sensing elements 442p,q has a heater 454p,q and a sensor 456p,q, respectively, positioned in a sensor base 452. In the illustrated example, the sensor 456p,q is a temperature sensor (or temperature sensor) capable of measuring fluid temperature.

In some examples, the sensor elements 442p,q are calorimetric type flow sensors (or flow meters) that have two sensing elements such as, for example, a sensor for velocity measurement (scalar sensor) and a sensor for directional measurement (vector sensor). The heater 454p,q and the temperature sensor 456p,q interact to operate as velocity (or scalar) and directional (or vector) sensors.

To determine fluid velocity, the sensing elements 442p,q act as calorimetric sensors. The heater 454p,q (or hot body) of each sensor elements 442p,q is placed in thermal contact with the fluid in the well 104. The rate of heat loss of the heater 454p,q to the fluid is a function of the fluid velocity as well as thermal properties. A heat dissipation rate of the heater 454p,q may be measured, and a flow velocity can be determined for a known fluid. The heater 454p,q generates heat (e.g., from electricity), and dissipates the heat to the fluid in contact. The rate of heat generation and the temperature may be readily measurable during operation.

The temperature sensor 456p,q may be used to monitor ambient temperature of the fluid, while the heater 454p,q measures its own temperature during heating. The difference between the temperature of the heater 454p,q and the ambient temperature of the fluid is defined as temperature excursion. The temperature excursion, ΔT, may be written as follows:

$$\Delta T = T_h - T_a. \qquad \text{Equation (1):}$$

In Equation 1, $T_a$ represents the ambient temperature of the fluid as measured by the temperature sensor; $T_h$ represents the temperature of the heater; and the temperature excursion is proportional to the heater power at a given flow condition. A thermal property between the heater and the fluid such as, for example, thermal conductance, $G_{th}$, may be calculated according to following expression:

$$G_{th} = \frac{P}{T_h - T_a} = \frac{P}{\Delta T}. \qquad \text{Equation (2)}$$

In Equation 2, P represents the heater power in steady state. The inverse of this proportionality (or the thermal conductance) correlates the flow velocity $V_{flow}$ because $V_{flow}$ is a function of $G_{th}$. As provided by Equation 1, the thermal conductance is determined from three quantities: P (the heater power), $T_h$ (the temperature of the heater) and $T_a$ (the temperature of the fluid ambient). The quantities may be measured in steady state. Theoretically, the amount of power or temperature excursion used during measurement is immaterial to resultant thermal conductance. However, power and temperature excursion may affect accuracy because physical measurements have limits. In some cases, such as the configuration of FIG. 4B, a ΔT of a few degrees in Kelvin (K) may be considered appropriate.

In other examples, other thermal properties such as, for example, a normalized power dissipation are calculated to determine the flow velocity. The normalized power dissipation may be calculated according to the following expression:

$$\frac{P}{S(T_h - T_a)}. \qquad \text{Equation (3)}$$

In Equation 3, the normalized power dissipation is calculated by dividing the power of the heater by the temperature excursion and an area of a heating surface of the sensor, S.

The measurements taken by the calorimetric sensing elements 454p,q may be used obtain the heater-fluid thermal conductance, the normalized dissipated power, and/or other thermal properties. A measurement technique may involve either constant excursion or constant power. For the constant excursion technique, power sent to the heater may be regulated by electronics (e.g., the control unit 136) such that the heater temperature may be maintained at a constant excursion above the fluid ambient temperature. In steady state, the power measured is monotonically related to the thermal conductance, the normalized power dissipation, and/or other thermal properties. For the constant power technique, the heater may be supplied with a constant and predetermined power, while the heater temperature $T_h$ varies and may be determined by flow velocity.

Figure 5A:
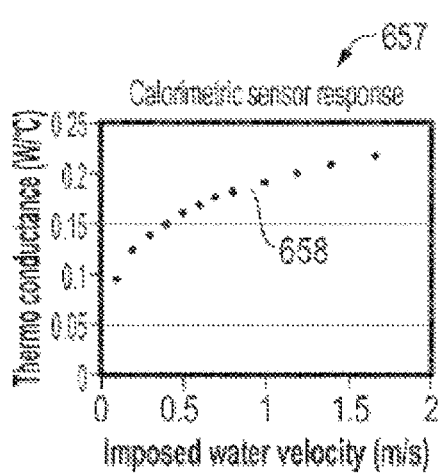
FIG. 5A is a graph illustrating sensor measurements.

FIG. 5A is a graph 657 depicting a flow response of a calorimetric sensor, such as the sensing elements 442a,b depicted in FIGS. 4A and 4B. The resulting thermal conductance verses flow curve 658 demonstrates that thermal conductance is non-linear relative to the flow velocity. However, the thermal conductance verses flow curve 658 is monotonic. Therefore, a correlation can be established to invert the measurement, and the flow velocity can be obtained as described in conjunction with Equations 1-2.

The measurement of flow velocity is a measurement of the thermal conductance, the normalized power dissipation, and/or other thermal properties between the heater 454p,q and the fluid. The measurement of thermal conductance and/or the normalized power dissipation may be determined with constant temperature excursion (ΔT) or constant heater power. The constant temperature excursion may regulate temperature. The constant heater power may regulate power. Either measurement technique may involve the heater 454p,q and the temperature sensor 456p,q.

Referring back to FIGS. 4A and 4B, the sensing elements 442p,q may also act as scalar sensors to determine fluid direction. In the illustrated example, the sensing elements 442p,q are capable of acting as both calorimetric sensors for determining fluid velocity and vector sensors for measuring fluid direction. Calorimetric sensors may be unable to determine fluid direction. In such examples, the calorimetric sensors may respond to fluid velocity regardless of direction. Fluid direction may be acquired by a second measurement, such as by using vector sensors capable of fluid direction detection. Fluid direction may also be acquired by, for example, the sensing elements 442p,q of FIGS. 4A and 4B configured for measurement of both fluid velocity and direction. Physics that enables directional detection may also involve detection of asymmetry in temperature between upstream and downstream sensing elements (e.g., caused by heat from the heater 454p of the upstream sensing element), such as the upstream sensing elements 242a and the downstream sensing elements 242b of FIG. 2A.

FIGS. 4A and 4B depict configurations of the sensing element 442p,q capable of detecting both fluid flow rate and direction. FIG. 4A depicts a thermocouple (TC) sensing element 442p. FIG. 4B depicts a dual sensing element 442q. The base 452 for each sensing element 442p,q is sized for hosting the heater 454p,q, the sensor 456p,q and/or other devices therein.

In some examples, the base 452 has a minimum thickness, or is recessed in the downhole tool, to prevent damage in the well 104. The sensor base 452 is positionable downhole, for example, on the treatment device 122, 222 and/or the coiled tubing 114, 214 (FIGS. 1, 2A, 2B). The base 452 may be round as shown in FIG. 4A or rectangular as shown in FIG. 4B. The base 452 may be made of epoxy, PEEK molding and/or any other material.

The heater 454p,q and the temperature sensor 456p,q may be positioned in close proximity in base 452, but are thermally isolated from each other. In the illustrated example, because the heater 454p,q creates a temperature gradient in the fluid, the temperature sensor 456p,q is provided with sufficient thermal isolation from the heater 454p,q to prevent the temperature sensor 456p,q from being disturbed by the heat flux of the heater 454p,q or thermally coupling with the heater 454p,q, which may result in an erroneous measurement value. The temperature sensor 456p,q may optionally be positioned in a separate package spaced from the heater 454p,q.

The TC sensing element 442p of FIG. 4A is depicted as having a pair of TC junctions (or sensors) $456p_{1,2}$ on either side of a heating pad (or heater) 454p. The TC junctions $456p_{1,2}$ are linked by a metal wire 460. Each TC junction $456p_{1,2}$ has a TC pad with leads 462a,b extending therefrom. In some examples, the leads 462 are also wires operatively coupled to a controller 436 for operation therewith.

The TC junctions 456p positioned on either side of the heater 454p may be used to detect a temperature imbalance therebetween, and convert it into a TC voltage. A small voltage is present if the two TC junctions $456p_{1,2}$ are at a different temperatures. The TC junctions $456p_{1,2}$ are positioned very close to the heater 454p (one on each side) for maximum contrast of temperature. At zero flow, the heater 454p may heat up both TC junctions $456p_{1,2}$. However, the heating does not produce voltage.

Two metal pads 464p are depicted as supporting the TC junctions $456p_{1,2}$. The metal pads 464p may be provided to improve the thermal contact between the TC junctions $456p_{1,2}$ and the fluid. The metal pads 464p may be useful in cases where the TC junctions $456p_{1,2}$ are of a small size. The metal pads 464p and the TC junctions $456p_{1,2}$ may be held together by thermal adhesives such as silver epoxies or any other thermally conductive adhesives. The metal pads 464p are positioned in alignment with the heater 454p, thereby defining a flowline 466p along the sensing element 442p as indicated by the arrow.

Figure 5B:
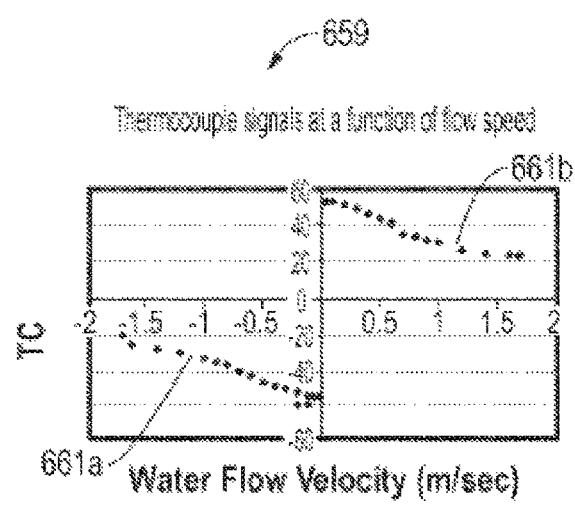
FIG. 5B is another graph illustrating sensor measurements.

TC voltage (y-axis) as a function of flow velocity (x-axis) is show in a graph 659 of FIG. 5B. The graph 659 exhibits an odd function of the flow velocity measured by the TC junctions $456p_{1,2}$. The magnitude of a maxima near zero flow tapers off gradually with increasing velocity. At zero crossing, the TC signal output undergoes an abrupt change in polarity from negative to positive as indicated by curves 661a,b, respectively. This change in signal polarity may be used to detect the fluid direction as described in greater detail below.

Figure 6:
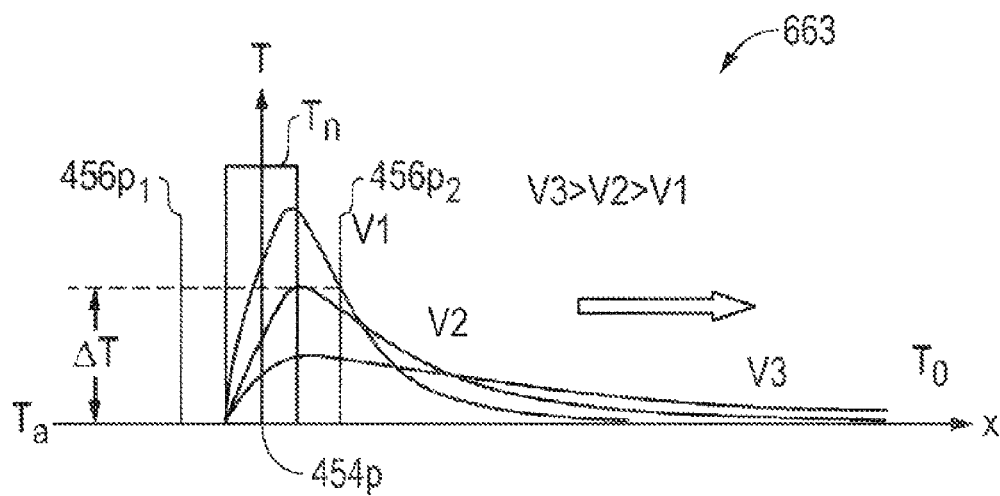
FIG. 6 is a graph of sensor measurements and fluid flow based on the sensor measurements.

The temperature profile along a flow stream of, for example, the sensing element 442p is shown schematically in FIG. 6. FIG. 6 is a graph 663 depicting temperature (y-axis) versus velocity (x-axis). As depicted by this graph, the heater 454p generates a constant heat $T_h$ measurable by the TC junction $456p_{1,2}$ on either side thereof. Heat from the heater 454p is carried downstream by the fluid forming a hot stream. The velocity V1, V2 and V3 are measured at, for example, different time intervals. Visibility of the thermal gradient may depend on the velocity. The thermal gradient between upstream and downstream is detectable with the sensor element 442p. This creates a temperature contrast between the upstream and downstream TC junctions $456p_{1,2}$. This indicates that the flow is moving towards the TC junctions $456p_{1,2}$, thereby indicating fluid flow direction. By detecting asymmetry between the TC junctions $456p_{1,2}$, the fluid direction can be determined as indicated by the arrow.

The dual-element sensing element 442q of FIG. 4B is depicted as having two identical elements (sensors/heaters) 456q/454q. The sensors/heaters 456q/454q are depicted as Element M and Element N in the sensing element 442q. In some examples, the heater 454q and the sensor 456q (and, therefore, Elements M and N) are interchangeable in function and operation. In some such cases, the sensor 456q is capable of performing the functions of the heater and the heater 454q is capable of performing the functions of the sensor. The Elements M and N are operatively linked via links 455 to the controller 436 for operation therewith.

In some examples, a desired measurement may be operated in self-referenced mode in which a single Element M or N plays a dual role, both as heater and as temperature sensor. In some such cases, the heater and the temperature sensor may utilize a time multiplexing technique. In some examples, the role of the heater 454q and temperature sensor 456q may be reassigned at anytime. This measurement scheme may be used to provide flexibility in designing and/or operating the sensor element 442q, which may be tailored to a particular application.

An asymmetry of temperature between the identical Elements M and N is detectable by the dual-element sensor 442q. The two identical Elements M and N are positioned along a line of flow of the fluid as indicated by the arrow. The Elements M and N may be positioned in close proximity, for example, within the same base (or package) 452.

Measurement by the sensor element of FIG. 4B may be achieved using various methods. A first method involves measuring the heater power in flow using Element M as the heater and Element N as the temperature sensor. After a stable reading is attained, the roles of Elements M and N interchange and the measurement is repeated. Comparing the power of the two measurements, fluid direction can be ascertained. The heater that consumes more power is located upstream, provided that the flow does not vary in the meantime. A second method that may be used involves measuring by heating both elements M and N simultaneously with the same amount of power. The measurements of each element may be compared. Whichever element reveals a higher temperature is downstream in the direction of the fluid flow. A third method that may be used involves watching the temperature of Element M while switching on and off Element N at a certain power level. If an alteration of temperature is noticed, Element N may be assumed to be upstream of Element M. No change may suggest otherwise.

With the first two methods, where quantities are compared across Elements M and N, a good match of characteristics of the two elements M, N reduces potential errors. The match of elements may be achieved by calibration and normalization. The third method, on the other hand, may be used without as good of a match. Dual-element sensors are usable, for example, for bi-directional flow.

When the temperature sensor $456p,q$ and the heater $454p,q$ of FIGS. 4A and 4B reside in the same package (for instance, due to space constraint), the temperature sensor $456p,q$ is positioned upstream of the heater $454p,q$ (or element M is upstream of Element N). If flow goes in both directions, the temperature sensor $456p,q$ and heater $454p,q$ (or Elements M and N) may be positioned in a side-by-side (or flowline) configuration in line with the flow of the fluid as shown in the sensing elements $442p,q$ of FIGS. 4A and 4B.

While FIG. 4A depicts a single heater $454p$ with a pair of TC junctions $456p$ and FIG. 4B depicts a single heater $454p$ with a single temperature sensor $456q$, other examples employ multiple heaters $454p,q$ and/or sensors $456p,q$. Additional sensors and/or other devices may be incorporated into the sensing elements $442p,q$ and/or used in combination therewith. In sensor systems including multiple heaters $454p,q$, one temperature sensor $456p,q$ can serve multiple heaters $454p,q$. Some multi-elements sensors have more than two elements (e.g., M, N, P, D . . . ). As shown in FIG. 4B, a third element O may be provided. In another method of measurement, the three or more elements (e.g., M, N, O) may be used to detect fluid direction by heating a middle element and comparing the temperature between upstream and downstream elements thereabout.

As shown, the sensing elements $442p,q$ of FIGS. 4A and 4B (and/or the sensors, heaters, elements and/or other components used therein and/or therewith) are operatively coupled to the controller 436 for providing power, collecting data, controlling and/or otherwise operating the sensing element $442p,q$. The controller 436 may be, for example, the logging tool 128, the control unit 136 and/or other electronics capable of providing power, collecting data, controlling and/or otherwise operating the temperature sensors $456p,q$, heater $456p,q$ and/or other elements of the sensing elements $442p,q$. The power sources may be batteries, power supplies and/or other devices internal to and/or external to the sensing elements. In some cases, other devices such as the logging tool 128 of FIG. 1A may provide power thereto. Such electronic devices may be internal and/or external to the sensing elements. Communication devices may be provided to wire and/or wirelessly coupled the sensing elements to downhole and/or surface communication devices for communication therewith. In some cases, communication devices, such as transceivers may be provided in the sensing elements. In other cases, the sensing elements may be linked to the logging tool 128 (FIG. 1A) or other devices for communication as desired.

The sensing elements are also operatively coupled to and/or in communication with databases, processors, analyzers, and/or other electronic devices for manipulating the data collected thereby. The power, electronic and/or communication devices may be used to manipulate data from the sensing elements, as well as other sources. The analyzed data may be used to make decisions concerning the wellsite and operation thereof. In some cases, the data may be used to control the well operation. Some such control may be done automatically and/or manually as desired.

Figure 7:
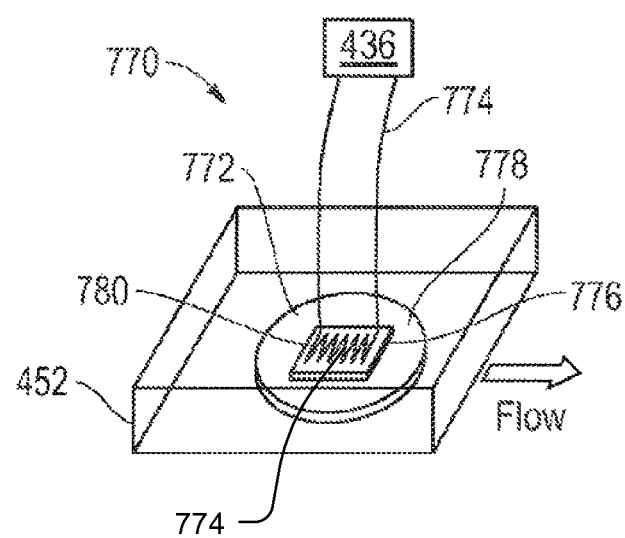
FIG. 7 illustrates various components of an example device that can implement embodiments of the methods and apparatus for determining downhole parameters.

While elements of the heater and the temperature sensor may be physically identical, the sensor can have a variety of types, forms and/or shapes. FIG. 7 depicts the sensor 770 usable as an element of the sensor elements $454p,q$ of FIGS. 4A and/or 4B. FIG. 7 depicts the sensor 770 usable as the heater $454q$ and/or the temperature sensor $456q$, as elements M, N and/or O, or in combination therewith. A shown, the sensor 770 is positionable in the base 452. The sensor 770 may be operatively coupled to the controller 436 via wires 774 for operation therewith in the same manner as previously described for the sensor elements $442p,q$.

The example sensor 770 of FIG. 7 is an RTD type sensor with a resistance that varies with temperature. In some examples, the sensor 770 is used for temperature sensing purposes. However, the sensor 770 may generate heat when current passes through the sensor 770. Thus, the example sensor 770 can be used both as a heater and a temperature sensor (e.g., $454p,q$ and $456p,q$ of FIG. 4B).

A thin-film type RTD capable of use as both a heater and temperature sensor may be used so that it can interchangeably operate as the Element M, N and/or O of FIG. 4B. As shown in FIG. 7, the sensor 770 positioned in the base 452 has a front surface (or contact surface) 772 positionable adjacent the fluid for taking measurements therefrom. In some examples, the sensor 770 employs platinum in the form of either wire or thin film (or resistor) 774 deposited on a heat-conductive substrate 776, such as sapphire or ceramic. The wire 774 is positioned in the film 776 and extends therefrom for operative linkage with the controller 436. The heat-conductive substrate 776 may be adhered or bonded to a thin pad 778 (made of, for example, Inconel or ceramic substrate) by a thermally conductive adhesive 780, such as silver epoxy, or by brazing. In some examples, such bonding provides low thermal resistance.

In the illustrated example, the sensor 770 is wrapped in protective packaging, but they may differ by thermal mass and, hence, response time. The shape of the pad 778 may be square, circular or any other shape capable of supporting the RTD in the base 452. In some examples, the pad 778 has a dimension of about 10 mm (or more or less), and a thickness sufficient for mechanical viability. The thickness and material selected may determine the performance of heater-fluid thermal contact.

The example sensor 770 may be configured with a large surface area for contact with the fluid and/or large thermal mass for passage of heat therethrough. A larger thermal mass may result in a relatively slower measurement response. However, the thermal mass may also assist in reducing (e.g., averaging out) spurious variations in readings caused by turbulence. Sensor electronics may also be provided to reduce spurious variations.

The sensor 770 and/or the sensing element $442q$ may be configured in a surface (or non-intrusive) form with a low profile (or thickness) as shown in FIGS. 7 and 4B. The sensor 770 and/or the sensing element $442q$ may be positionable downhole via a downhole tool (e.g., coiled tubing system 102 of FIG. 1A) extending a small distance (if any) therefrom. This low profile or non-intrusive surface form may be provided to reduce the disturbance to the fluid flowing across the sensor, while still allowing for measurement of the fluid. Moreover, the low profile surface form may also be configured to limit the amount of protrusion from the downhole the tool and, therefore, potential damage thereto.

Figure 8:
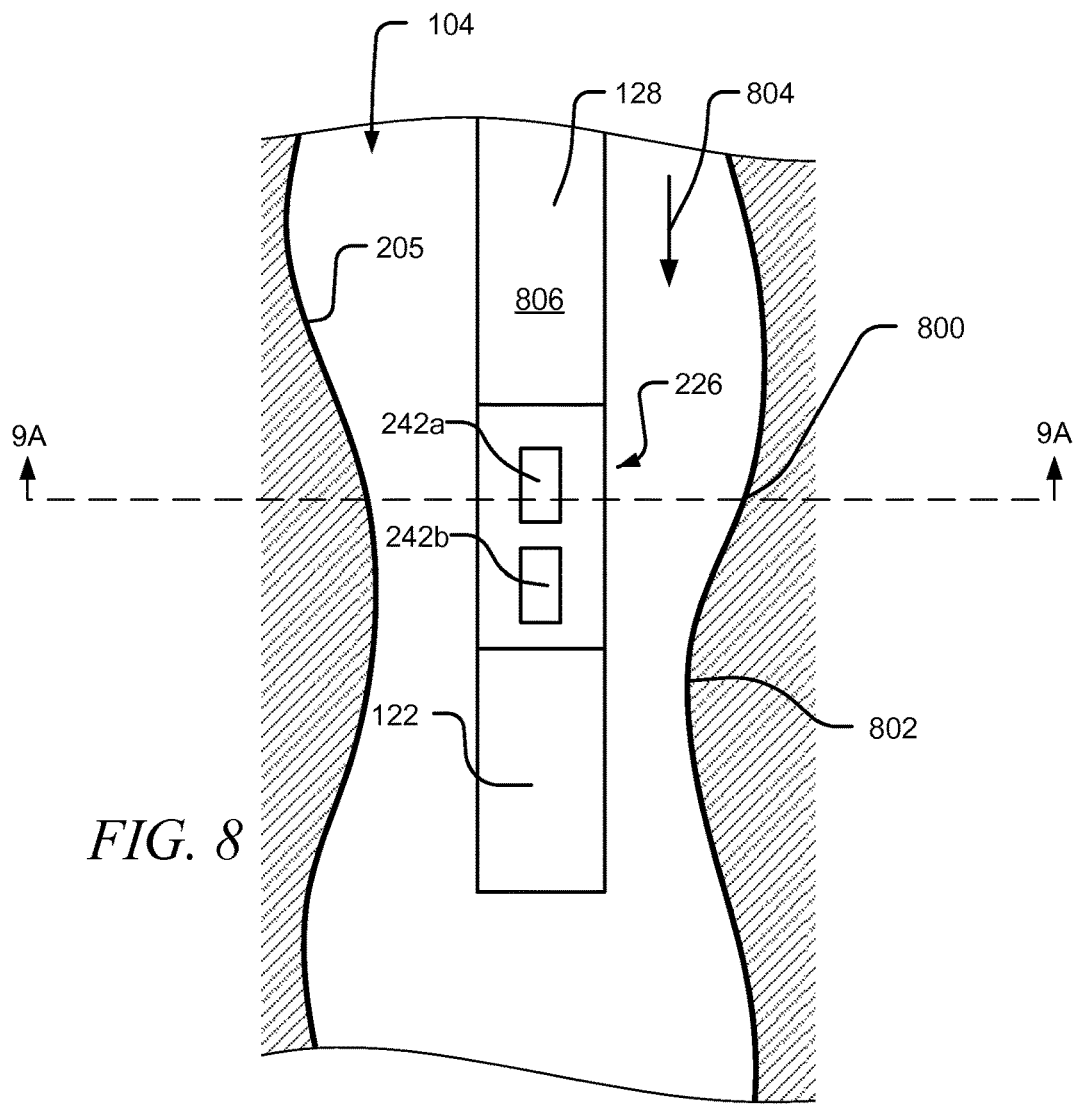
FIG. 8 illustrates various components of the example device of FIG. 2E that can implement embodiments of the methods and apparatus for determining downhole parameters.

FIG. 8 illustrates the example sensing system 226, which may be used to determine a parameter of the well 104 (e.g., a cross-sectional area of the well 104, a width of the well 104, a distance from the example sensing system 226 to the wall 205 of the well 104, a diameter of the well 104, etc.) at a given depth. In some examples, a form (e.g., a shape of the well such as, for example, round, oblong, asymmetric, irregularly-shaped, etc.) of the well 104 varies with depth. As a result, well dimensions may vary with the depth. In the illustrated example, a first cross-sectional area of the well 104 at a first depth 800 is greater than a second cross-sectional area of the well 104 at a second depth 802.

In some examples, the pump 115 pumps fluid through the well 104. In the illustrated example, the fluid flows through the well 104 in a direction of arrow 804. In other examples, the fluid flows in other directions (e.g., toward a surface of Earth). In some examples, the pump 115 pumps the fluid through the well 104 at a substantially constant flow rate. In some examples, the fluid is pumped into the well via coiled tubing 806 and/or any other conveyance tool. In some such examples, the fluid is pumped through a sealed portion of the well 104 (e.g., a portion of the well 104 in which the fluid is not escaping into a production zone). As a result, a velocity of the fluid flowing through the well 104 varies as a function of the form and/or one or more dimensions of the well 104 such as, for example, the cross-sectional area of the well 104. For example, because the cross-sectional area of the well 104 at the first depth 800 is greater than the cross-sectional area of the well 104 at the second depth, the velocity of the fluid at the first depth 800 is less than the velocity of the fluid at the second depth 802.

Figure 9:
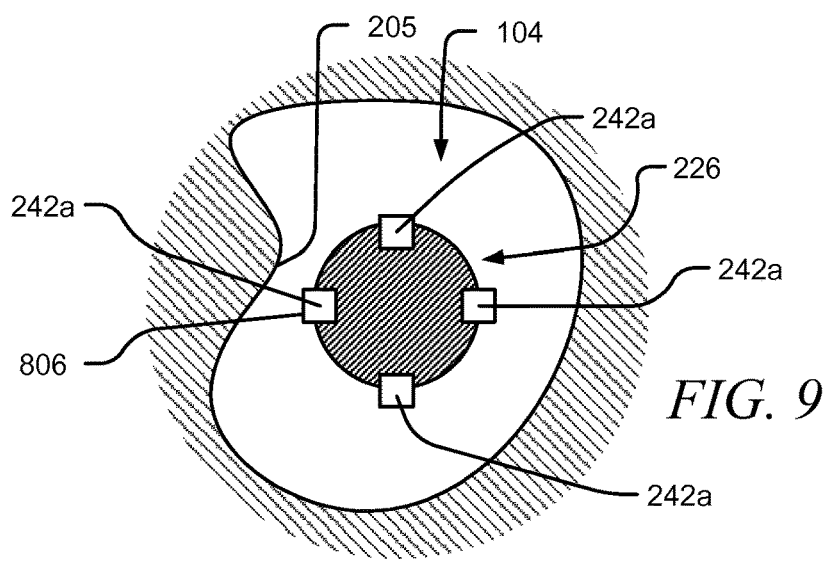
FIG. 9 illustrates various components of the example device of FIG. 8 that can implement embodiments of the methods and apparatus for determining downhole parameters.

FIG. 9 is a cross-sectional view of the example well 104 of FIG. 8 at the first depth 800. In the illustrated example, the well 104 has an amebic cross-sectional shape. Other examples have other shapes (e.g., circular). The example sensing system 226 includes four of the sensing elements 242a disposed about a circumference of the coiled tubing system 102. Other examples include other numbers of the sensing elements 242a (e.g., 1, 2, 3, 5, 6, etc.), which may disposed about the circumference of the coiled tubing system 102 at other positions.

The parameter of the well 104 at a given depth may be determined via one or more of the sensing elements 242a,b of the example sensing system 226 of FIG. 8. For example, the sensing system 226 may be lowered into the well 104 such that the sensing element 242a is positioned at the first depth 800. In some examples, the sensing element 242a includes a heater and a temperature sensor (e.g., the example heater 454 of FIG. 4, the example temperature sensor 456 of FIG. 4, the example RTD sensor 770 of FIG. 7), which are used to determine a first velocity of the fluid at the first depth 800. Based on the first velocity of the fluid, a first parameter of the well 104 at the first depth 800 is determined. In some examples, the first parameter of the well is associated with the first depth 800. The first depth 800 of the example sensing element 242a may be determined based on an amount (e.g., length) of the coiled tubing 114 deployed into the well 104 and/or via any suitable depth measuring device.

In some examples, the example sensing system 226 may be used to determine a plurality of parameters of the well 104 at a plurality of depths. Based on the plurality of parameters at the plurality of depths, a profile, (e.g., an image, a map, a model, a graph, a chart, a log, a table etc.) of a portion of the well 104 may be generated.

Figure 10:
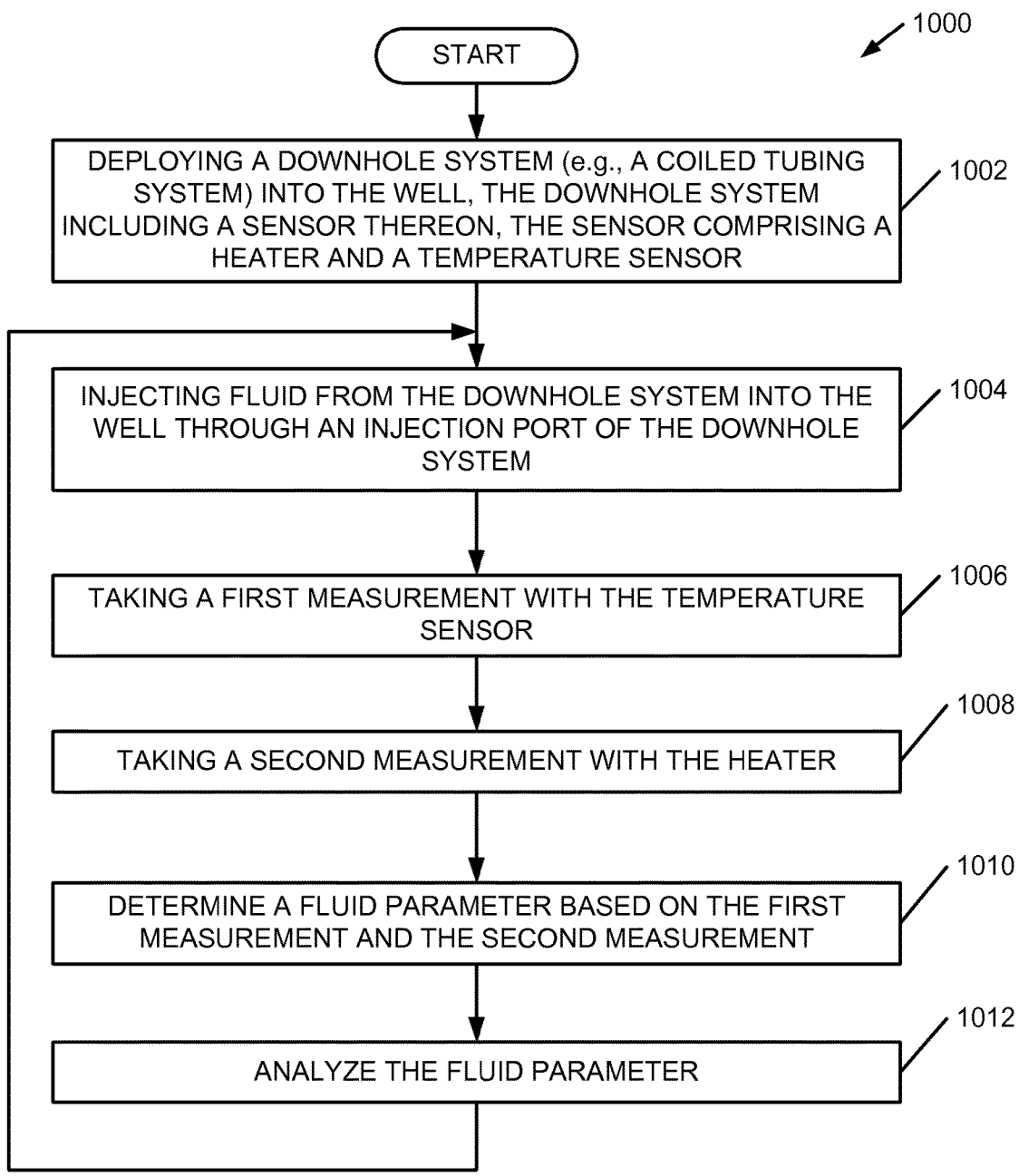
FIG. 10 illustrates example method(s) for determining downhole parameters in accordance with one or more embodiments.
Figure 11:
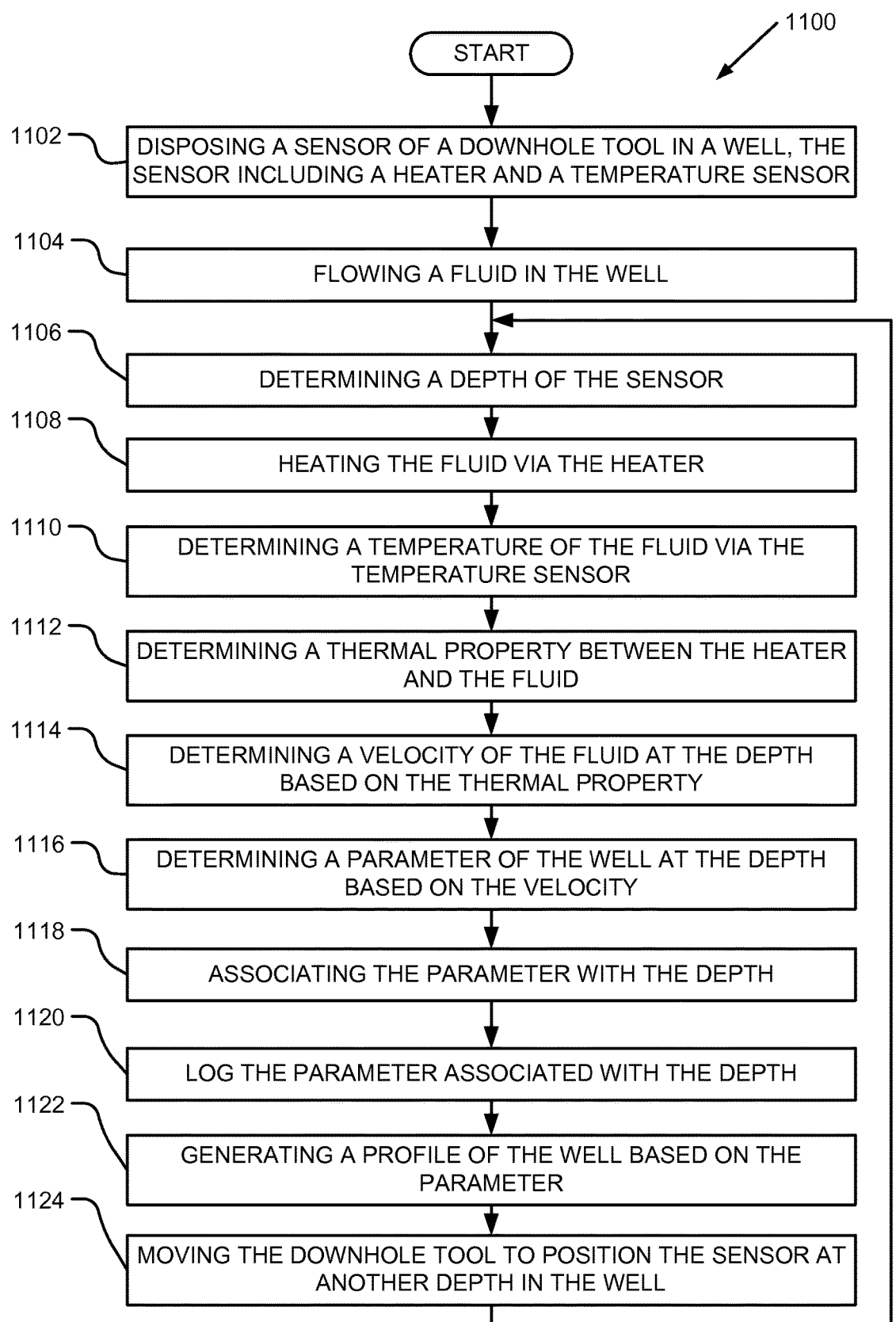
FIG. 11 illustrates example method(s) for determining downhole parameters in accordance with one or more embodiments.

FIGS. 10-11 are flowcharts representative of example methods disclosed herein. At least some of the example methods of FIGS. 10-11 may be carried out by a processor, the logging tool 128, the controller 436 and/or any other suitable processing device. In some examples, at least some of the example methods of FIGS. 10-11 are embodied in coded instructions stored on a tangible machine accessible or readable medium such as a flash memory, a ROM and/or random-access memory RAM associated with a processor. Some of the example methods of FIGS. 10-11 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, one or more of the operations depicted in FIGS. 10-11 may be implemented manually or as any combination of any of the foregoing techniques, for example, any combination of firmware, software, discrete logic and/or hardware.

Further, although the example methods are described in reference to the flowcharts illustrated in FIGS. 10-11, many other methods of implementing the example methods may be employed. For example, the order of execution of the blocks may be changed, and/or some of the blocks described may be changed, removed, sub-divided, or combined. Additionally, any of the example methods of FIGS. 10-11 may be carried out sequentially and/or carried out in parallel by, for example, separate processing threads, processors, devices, discrete logic, circuits, etc.

FIG. 10 illustrates an example method 1000 disclosed herein that may be used to determine one or more fluid parameters. At block 1002, a downhole system such as, for example, the coiled tubing system 100 of FIG. 1A is deployed into a well with a sensor (e.g., one of the example sensor elements 242a,b of FIG. 2A) thereon. In some examples, the sensor includes a heater (e.g., the example heater 454 of FIG. 4, the example RTD sensor 770 of FIG. 7) and a temperature sensor (e.g., the example temperature sensor 456 of FIG. 4, the example RTD sensor 770 of FIG. 7). At block 1004, fluid is injected from the downhole system into the well via an injection port (e.g., the example injection port 224 of FIG. 2) of the downhole system.

At block 1006, a first measurement (e.g., a temperature of the fluid) is taken with the temperature sensor. At block 1008, a second measurement (e.g., power dissipated via the heater, a temperature of the heater, etc.) is taken with the heater. At block 1010, a fluid parameter (e.g., a fluid velocity, a direction of fluid flow) is determined based on the first measurement and the second measurement. At block 1012, the fluid parameter is analyzed. In some examples, the measurements and/or the parameter are stored, processed, reported, and/or manipulated, etc.

FIG. 11 illustrates another example method 1100 disclosed herein, which may be used to generate a profile of the well 104. The example method 1100 of FIG. 11 begins by disposing a sensor (e.g., the example sensor element 242a) of a downhole tool (e.g., the example coiled tubing system 102) in a well (block 1102). The sensor includes a heater (e.g., the example heater 454 of FIG. 4) and a temperature sensor (e.g., the example temperature sensor 456 of FIG. 4). At block 1104, fluid is flowed in the wellbore. In some examples, the fluid is flowed (e.g., by the pump 115) at a substantially constant flow rate. At block 1106, a depth of the sensor is determined. In some examples, the depth of the sensor is determined based on an amount (e.g., length) of coiled tubing deployed into the well and/or via any suitable depth measuring device. At block 1108, the fluid is heated via the heater and, at block 1110, the temperature of the fluid is determined via the temperature sensor. A thermal property (e.g., normalized power dissipation, thermal conductance, thermal resistance, etc.) between the heater and the fluid is determined (block 1112) and, based on the thermal property, a velocity of the fluid at the depth is determined (block 1114).

The velocity of the fluid varies as a function of a form (e.g., shape) of the well and/or one or more dimensions (e.g., a cross-sectional area) of the well. Thus, at block 1116, a parameter of the well (e.g., a cross-section, the cross-sectional area, a width, a diameter, etc.) at the depth is determined based on the velocity. The parameter of the well is associated with the depth (block 1118). For example, if a width of the well is one foot at one thousand feet below the surface, the width of one foot is associated with the depth of one thousand feet. At block 1120, the parameter associated with the depth is logged. For example, the parameter associated with the depth may be stored in a database. At block 1122, a profile of the well is generated based on the parameter. In some examples, an image, a map, a model, a graph, a chart, a table and/or any other profile of the well is generated based on the parameter associated with the depth stored in the database and/or any other information. At block 1124, the downhole tool is moved to position the sensing element at another depth in the well, and the example method returns to block 1106. Thus, the downhole tool may be traversed through a portion of the well and used to determine a first parameter of the well at a first depth, a second parameter of the well at a second depth, a third parameter of the well at a third depth, etc. As a result, a profile of the portion of the well through which the downhole tool is traversed may be generated.

Although only a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

What is claimed is:

1. A method, comprising:
    disposing a downhole tool to a depth in a well on a reeled conveyance, the downhole tool including a calorimetric sensor having a heater and a temperature sensor, the heater and the temperature sensor positioned on and flush with an exterior surface of the downhole tool;
    flowing a fluid in the well, the heater and the temperature sensor in thermal contact with the fluid;
    determining a first velocity of the fluid at a first depth via the calorimetric sensor; and
    determining a first parameter of the well at the first depth based on the first velocity of the fluid.

2. The method of claim 1 wherein determining the first velocity of the fluid at the first depth comprises heating the fluid and determining a temperature of the fluid.

3. The method of claim 2 further comprising determining a thermal property between the heater and the fluid.

4. The method of claim 1 further comprising determining the first depth and associating the first depth with the first parameter.

5. The method claim 1 further comprising:
    moving the conveyance and the downhole tool to move the calorimetric sensor from the first depth to a second depth;
    determining a second velocity of the fluid at the second depth;
    determining a second parameter of the well at the second depth based on the second velocity of the fluid;
    determining the second depth; and
    associating the second depth with the second parameter.

6. The method of claim 1 further comprising generating a profile of the well based on the first parameter.

7. The method of claim 1 wherein the first parameter is a cross-sectional area of the well.

8. A method, comprising:
    disposing a downhole tool in a well on a reeled conveyance;
    determining a first depth of a calorimetric sensor of the downhole tool disposed in a well, the sensor including a heater and a temperature sensor, the heater and the temperature sensor positioned on and flush with an exterior surface of the downhole tool;
    determining a first velocity of a fluid in the well via the calorimetric sensor, the heater and the temperature sensor in thermal contact with the fluid;
    determining a first parameter of the well based on the first velocity of the fluid;
    associating the first parameter with the first depth; and
    generating a profile of the well based on the first parameter.

9. The method of claim 8 wherein determining the first velocity of the fluid comprises heating the fluid via the heater and determining a temperature of the fluid via the temperature sensor.

10. The method of claim 8 further comprising determining a thermal property between the heater and the fluid.

11. The method of claim 8 further comprising flowing the fluid in the well at a substantially constant rate.

12. The method of claim 8 wherein the first parameter is a cross-sectional area of the well.

13. The method claim 8 further comprising:
    moving the conveyance and the downhole tool to move the sensor from the first depth to a second depth;
    determining the second depth;
    determining a second velocity of the fluid via the calorimetric sensor;
    determining a second parameter of the well based on the second velocity; and
    associating the second parameter with the second depth.

14. The method of claim 13 further comprising generating a profile of the well based on the second parameter.

15. A method, comprising:
    disposing, in a well, via a coiled tubing, a calorimetric sensor comprising a heater and a temperature sensor of a downhole tool at a first depth, the heater and the temperature sensor positioned in a sensor base on and flush with an exterior surface of the downhole tool;
    heating a fluid in the well via the heater, the heater and the temperature sensor in thermal contact with the fluid;
    determining a temperature of the fluid via the temperature sensor;
    determining a first velocity of the fluid at the first depth based on a thermal property between the heater and the fluid; and determining a first parameter of the well at the first depth based on the first velocity of the fluid.

16. The method of claim 15 further comprising flowing a fluid through the well at a substantially constant flow rate.

17. The method of claim 15 further comprising:
determining the first depth; and
associating the first velocity with the first depth.

18. The method of claim 15 further comprising:
moving the coiled tubing and the downhole tool from the first depth to a second depth;
determining a second velocity of the fluid at the second depth; and
determining a second parameter of the well at the second depth based on the second velocity.

19. The method of claim 18 further comprising:
determining the second depth; and
associating the second velocity with the second depth.

20. The method of claim 15 further comprising generating a profile of the well based on the first parameter.

* * * * *